Oct. 22, 1929.   W. J. HEALY ET AL   1,733,011
STAND
Filed March 1, 1929

Inventors
W. J. HEALY
W. P. HEALY
By Victor J. Evans
Attorney.

Patented Oct. 22, 1929

1,733,011

UNITED STATES PATENT OFFICE

WILLIAM J. HEALY AND WILLIAM P. HEALY, OF MERCED, CALIFORNIA

STAND

Application filed March 1, 1929. Serial No. 343,790.

This invention relates to improvements in stands and has particular reference to a Christmas tree stand.

The principal object of the invention is to produce a stand which will accommodate trees of varying sizes, that is trees wherein the butt of the tree may be several inches larger or smaller and yet come within the capacity of the stand.

A further object is to produce a device whereby the tree may be readily clamped in the stand without the employment of a complicated clamping mechanism.

A still further object is to produce a stand which is ornamental.

Other objects and advantages will be apparent during the course of the following description.

Figure 1:
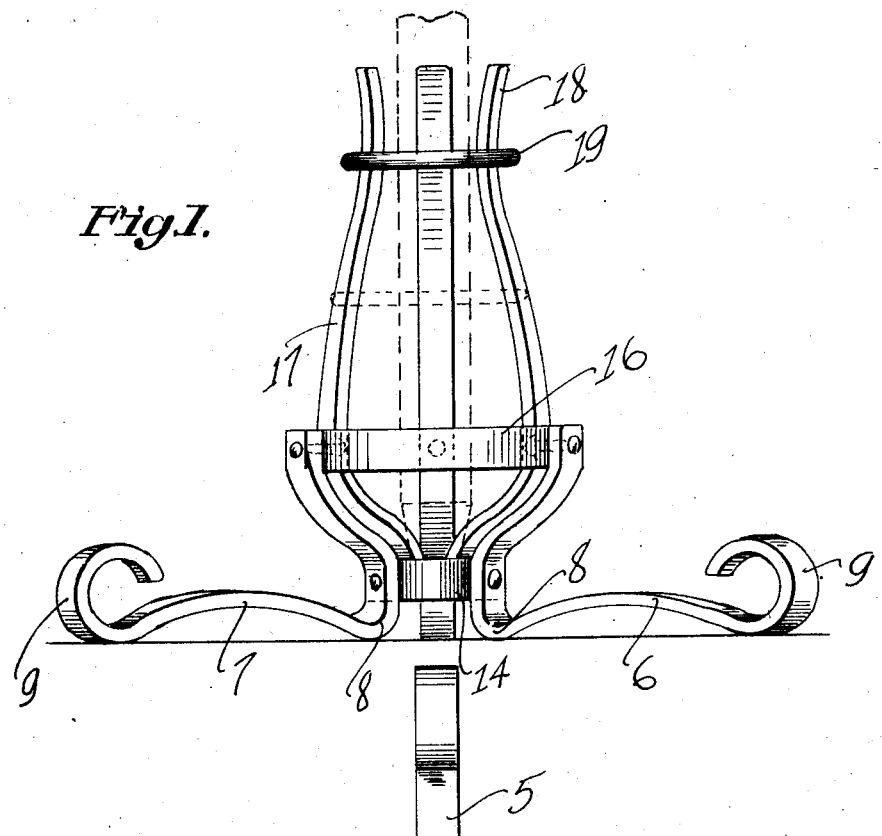
Figure 2:
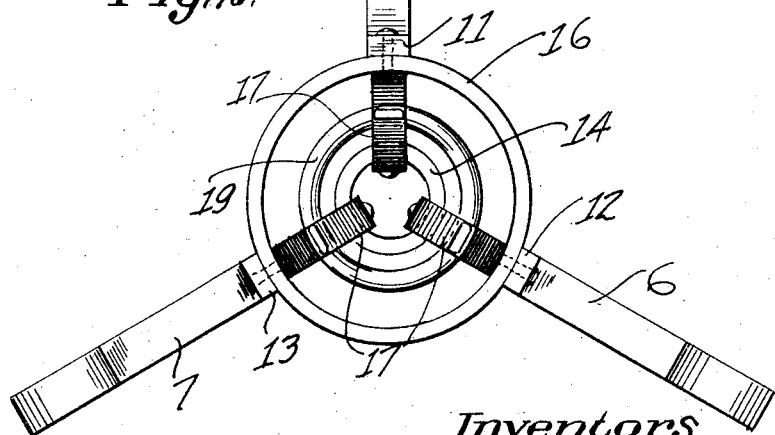

In the accompanying drawings forming a part of this specification and in which like numerals are employed to designate like parts throughout the same, Figure 1 is a side elevation of our stand, and Figure 2 is a top plan view thereof.

Applicants are aware of the fact that there are many forms of Christmas tree stands, which stands however fail to accomplish in many instances the objects above set forth. The average stands require considerable ingenuity in order to adjust the same with respect to the tree. Other stands are of that peculiar construction where it is exceedingly difficult to maintain the tree in vertical alignment. Applicants have therefore devised a simple stand wherein the base of the tree is firmly held at one point and the tree is further held a short distance thereabove by a plurality of contractable arms.

In the accompanying drawings wherein for the purpose of illustration is shown a preferred embodiment of our invention, the numerals 5, 6 and 7 refer to bent metal members which may take any desired ornamental shape as for instance the shape shown in Figure 1, the point being that these legs 5, 6 and 7 have contacting points as shown at 8 and 9, the contacting points 8 being adjacent the center while the contacting points 9 are spaced a considerable distance away, thereby forming a brace. The upwardly extending portions of the legs 5, 6 and 7 are designated by the numerals 11, 12 and 13 respectively, and are flared from their point of connection to a ring 14, to their connection with a ring 16. To the inner surface of the ring 16 is secured a plurality of tree engaging elements 17 which may be of any desired number. These elements are preferably made of resilient material and have their upper ends flared as shown at 18 so as to provide a lead-in for the bottom of the tree.

A ring is shown at 19, which ring serves the purpose of contracting the resilient tree engaging members 17 when the ring is moved to the dotted line position of Figure 1. The result of this construction is that when it is desired to place a tree therein, the lower portion of the tree is sharpened and inserted in the stand so that the sharpened end rests in the ring 14. This position is illustrated in dotted lines of Figure 1. The ring 19 is now pushed downwardly toward the ring 16 with the result that the tree engaging arms 17 are forced inwardly so as to contract the tree at a point below its lower extremity.

It will thus be seen that our device will accomplish all the objects above set forth.

It is to be understood that the form of our invention herewith shown and described is to be taken as a preferred example of the same and that various changes relative to the size, shape, material and arrangements of parts may be resorted to without departing from the spirit of the invention or the scope of the subjoined claims.

Having thus described our invention, we claim:—

1. In a support of the character described, a plurality of angularly disposed leg portions, said leg portions being bent and secured to a ring, the upper extremity of each of said leg portions being flared, a second ring secured to the flared ends of said legs, a plurality of tree engaging members secured to said ring, and means for contacting said tree engaging members for the purpose specified.

2. In a support of the character described, a plurality of angularly disposed leg portions, said leg portions being bent and secured to a ring, the upper extremity of each of said leg portions being flared, a second ring secured to the flared ends of said legs, a plurality of tree engaging members secured to said ring, means for contacting said tree engaging members, said means comprising a ring encircling said tree engaging elements and being slidable thereon.

In testimony whereof we affix our signatures.

WILLIAM J. HEALY.
WILLIAM P. HEALY.